United States Patent [19]

Harrison et al.

[11] Patent Number: 4,660,106
[45] Date of Patent: * Apr. 21, 1987

[54] DATA TRANSDUCER POSITION CONTROL SYSTEM FOR ROTATING DISK DATA STORAGE EQUIPMENT

[75] Inventors: Joel N. Harrison, Campbell; Donald V. Daniels, Santa Cruz; David A. Brown, Saratoga, all of Calif.

[73] Assignee: Quantum Corporation, Milpitas, Calif.

[ * ] Notice: The portion of the term of this patent subsequent to Nov. 24, 1998 has been disclaimed.

[21] Appl. No.: 496,924

[22] Filed: May 23, 1983

Related U.S. Application Data

[63] Continuation of Ser. No. 190,198, Sep. 24, 1980, Pat. No. 4,396,959.

[51] Int. Cl.⁴ .................... G11B 21/10; G11B 21/08; H02K 37/00
[52] U.S. Cl. ........................................ 360/77; 360/71; 360/75; 360/78; 310/49 R
[58] Field of Search ...................... 360/77, 78, 71–76; 310/49 R

[56] References Cited

U.S. PATENT DOCUMENTS

| | | |
|---|---|---|
| 3,185,972 | 5/1965 | Sippel . |
| 3,691,543 | 9/1972 | Mueller .................................. 360/77 |
| 3,737,883 | 6/1973 | Sordello et al. ........................ 360/78 |
| 3,812,533 | 5/1974 | Kimura et al. ........................ 360/77 |
| 3,838,453 | 9/1974 | Buslik et al. . |
| 3,864,741 | 2/1975 | Schwartz ............................... 360/77 |
| 4,006,394 | 2/1977 | Cuda et al. . |
| 4,016,603 | 4/1977 | Ottesen . |
| 4,030,132 | 6/1977 | Iftikar et al. . |
| 4,032,984 | 6/1977 | Kaser et al. . |
| 4,048,660 | 9/1977 | Dennison et al. . |
| 4,056,830 | 11/1977 | Smith . |
| 4,084,201 | 4/1978 | Hack et al. . |
| 4,096,534 | 6/1978 | Brownback et al. ................... 360/78 |
| 4,103,314 | 7/1978 | Case ........................................ 360/78 |
| 4,135,217 | 1/1979 | Jacques et al. ........................ 360/77 |
| 4,188,646 | 2/1980 | Sordello et al. ....................... 360/77 |
| 4,194,226 | 3/1980 | Kaseta et al. . |
| 4,195,320 | 3/1980 | Andresen . |
| 4,217,612 | 8/1980 | Matla et al. . |

(List continued on next page.)

FOREIGN PATENT DOCUMENTS 51-81603 7/1976 Japan .

OTHER PUBLICATIONS

"Track Servo System" *IBM Technical Disclosure Bulletin*, vol. 16, No. 7, Dec. 73, pp. 2225-2226—L. F. Shew.
"Track Following and Seeking System" *IBM Technical Disclosure Bulletin*, vol. 13, No. 11, Apr. 71, pp. 3433-3434—C. A. Walton.
"Improvement in the Position Error Signal Detector Channel for a 'Buried Servo' Recording System" *IBM Technical Disclosure Bulletin*, vol. 23, No. 3, Aug. 30, pp. 1203-1210—C. Handen.
Shugart Associates, "SA 1000 8-inch Fixed Disk Drive," two page product bulletin dated 9/79.
H. P. Stickel, "New . . . Design", Aug. 77, Hewlett Packard Journal, pp. 2-15.
Wright, "Servo . . . Units", Computer Design, vol. 16, No. 7, Mar. 1977, pp. 99-103.

*Primary Examiner*—Robert S. Tupper
*Attorney, Agent, or Firm*—Lyon & Lyon

[57] ABSTRACT

An improved apparatus and method is disclosed for controlling the position of one moveable member relative to another. In the disclosed preferred embodiment of a rotating disk memory system, the moving member is a head carriage structure and the other is a frame carrying a rotating data storage disk. From externally supplied position selectron information, and from internally determined polyphase position information, open loop position changing movements are determined and carried out in accordance with monitored incremental polyphase position information generated during the movement. When a destination location has been reached one or more servo systems close loop in order to maintain the moving member precisely at the newly commanded location. A rotor for moving the member is an aspect of the present invention.

17 Claims, 12 Drawing Figures

U.S. PATENT DOCUMENTS

| | | |
|---|---|---|
| 4,224,514 | 9/1980 | Weber .......................... 250/231 SE |
| 4,237,502 | 12/1980 | Erickson, Jr. et al. . |
| 4,238,809 | 12/1980 | Fujiki et al. . |
| 4,257,074 | 3/1981 | Goss . |
| 4,272,793 | 6/1981 | Van Landingham ................. 360/78 |
| 4,285,015 | 8/1981 | Rose et al. . |
| 4,297,734 | 10/1981 | Laishley et al. . |
| 4,297,737 | 10/1981 | Andresen et al. . |
| 4,309,730 | 1/1982 | Sanderson . |
| 4,314,291 | 2/1982 | Oda et al. . |
| 4,333,117 | 6/1982 | Johnson . |
| 4,346,413 | 8/1982 | Hack . |
| 4,348,703 | 9/1982 | Janosi . |
| 4,352,131 | 9/1982 | Van Herk et al. . |
| 4,371,904 | 2/1983 | Brooke . |
| 4,390,912 | 6/1983 | Hertrich et al. . |
| 4,396,960 | 8/1983 | Matla et al. . |
| 4,418,370 | 11/1983 | Harrison . |

A

C

B

D

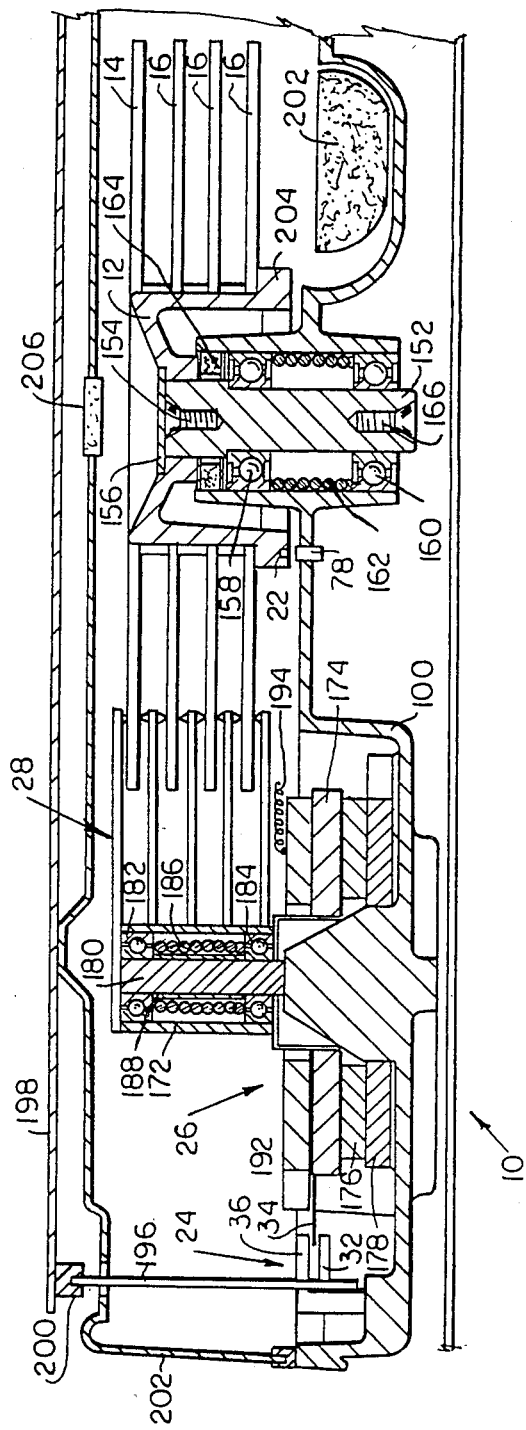
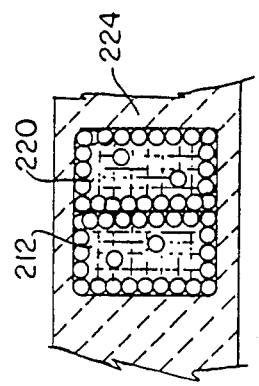
FIG. 9
FIG. 12

DATA TRANSDUCER POSITION CONTROL SYSTEM FOR ROTATING DISK DATA STORAGE EQUIPMENT

This is a continuing application of application Ser. No. 06/190,198, filed on Sept. 24, 1980, now U.S. Pat. No. 4,396,959.

BACKGROUND OF THE INVENTION

This invention relates to position control systems and methods for translating one member relative to another, and more particularly, this invention relates to methods and apparatus for moving a memory data device member such as a transducer relative to another member such as a desired concentric track of a rotating disk, and keeping the moved member in desired alignment with the other member, e.g. the transducer in registration with the track.

In electromechanical devices such as the rigid rotating memory drives disclosed by the prior art, two basic approaches have been taken in order to position data transducers radially relative to the rotating magnetic disk surface. A first, high cost approach was to utilize a dedicated servo system with a servo head and a replicated servo surface on the disk to provide a high performance track-following transducer positioning scheme. On the other hand a more recent, low cost approach was to utilize completely open loop stepping motor positioners which operated to place the transducers at arbitrarily defined tracks without any actual position information being fed back from the disk to the head positioner. The main drawback of the prior art low cost open loop approach was the requirement that tracks be spaced far enough apart to take into account all of the variations of the system, including mechanical tolerances in the stepping motor actuator, thermal expansion of the disk, and disk run-out. The result was a disk drive product which, while effective as a low cost unit, lacked the data storage capacity of the more expensive units with the result that the cost of storage per bit stored of the low cost drives approached the same cost as the earlier, more expensive storage units.

SUMMARY OF THE INVENTION

One object of the present invention is to provide a novel apparatus for positioning one member such as a data transducer relative to another member, such as a rotating data storage medium.

Another object of the present invention is to provide a low cost closed loop servo control system which combines the best features of the prior art to improve the accuracy of maintaining a transducer in alignment with a data track during read and/or write operations of a disk having high data track densities.

A further object of the present invention is to provide an improved yet more reliable open loop position seeking system which overrides a closed loop position maintaining servo control when seeking from one position to another position.

Yet another object of the present invention is to provide a lightweight, substantially linear, pure torque driven transducer carriage for rapidly moving the transducer radially across the data tracks during track seeking operations and to maintain the transducer on track during data read and write operations.

A still further object of the present invention is to provide a unique single servo sector on the rotating disk which contains track centerline data capable of being read by the transducer and converted to an offset value to provide a fine adjustment to the head carriage in order to maintain the transducer at the centerline of the track during read and write operations.

Yet one more object of the present invention is to provide an improved, yet simplified high speed and pure torque producing position translator for positioning one member radially relative to another member.

One more object of the present invention is to combine readily available and inexpensive electrical and mechanical components in a unique way to provide an improved position control system which occupies a small physical space, which requires only a modest power supply, which is inexpensive to manufacture and which operates reliably over a long useful life.

These and other objects of the present invention are obtained in electromechanical equipment such as data storage systems which include a frame and a member such as a head support structure rotatably mounted to the frame and moveable relative to said frame among preselected available ones of a multiplicity of selectable positions such as concentric data tracks of a rotating data storage disk.

The moveable member includes a bidirectionally moveable electromechanical mover supported by said frame.

A bidirectional mover driver is connected to the mover for moving the member to maintain it at a selected one of the positions during a maintained position mode of operation and to transport the member from a departure position to a destination position during a new position seeking mode of operation.

A position transducer provides a polyphase signal, such as quadrature, which is generated in response to actual sensed present position of the member relative to the frame.

A position controller is connected to the position transducer, said mover driver, and to an external source of new position selection information. The controller records the present position of the member relative to the frame; it calculates a new position seeking command in response to known present position and the new position selection information; and, it commands the member to move from the known present position to a requested destination position during a new position seeking mode of operation, by commanding at the mover a first spatial increment of maximum forward direction acceleration followed by a similar spatial increment of maximum reverse direction acceleration and then by commanding adaptively a slewing rate dependent upon incremental polyphase position information of the member provided by the position transducer until the destination position is reached.

A position-dependent closed loop servo is connected to the position transducer and to the mover driver for operatively controlling said driver to keep the member positioned within a selected one of the positions during the maintained position modes of operation, the loop being opened during accelerative portions of new position seeking modes of operation.

Another aspect of the present invention, particularly applicable to electromechanical systems such as rotating disk storage technology provides a fine position closed loop servo. It is connected to the driver and operates from prerecorded information in a single, data masked servo sector on a data surface of the rotating disk. This data is read by a head supported by the moveable member. A sample and hold circuit is connected to the head during its passes over the sector and holds the control data read therefrom. A correction signal generator, connected to the sample and hold circuit and to the driver generates and supplies an offset value which when applied to the driver promotes and maintains track centerline alignment of the head during read and/or write operations of the disk storage system. The fine position loop is overriden and ignored during accelerative portions of new position seeking modes of operation.

A rotor provides another aspect of the present invention, and it includes an even number of coil segments, which may be wound sequentially on a moving bobbin from a single strand of wire. The coil segments are arranged adjacently a thin disk and are connected to provide bidirectional, symmetrical torque. Potting compound encapsulates the coil structure and provides a very high resonant frequency and a capability to absorb vibration energy from the rotatable member.

The method of the present invention practiced in the environment of electromechanical equipment such as data storage systems which include moving a member such as head support structure relative to a frame among preselected available ones of a multiplicity of selectable positions such as concentric data tracks of a rotating data storage disk, including the steps of:

moving the member electromechanically relative to the frame in order to maintain it at a selected one of the positions during a maintained position mode of operation and in order to transport the member from a departure position to a destination position during a new position seeking mode of operation, generating a polyphase signal, such as quadrature, in response to sensed actual present position of the member relative to the frame, receiving and storing new position selection information from an external position control source, recording the present position of the member relative to the frame, calculating a new position seeking command in response to known present position and the new position selection information, commanding the member to move from the known present position to a requested destination position during a new position seeking mode of operation by commanding a first spatial increment of maximum forward direction acceleration, then commanding a similar spatial increment of maximum reverse direction acceleration, then commanding adaptively a position crossing slewing rate dependent upon incremental polyphase information of the member provided by the step of generating the polyphase signal until the destination position is reached, and then stopping and holding said member at said destination position until the next position changing movement is commanded, and serving upon said generated polyphase signal for operatively maintaining the member positioned within a selected one of the positions during the maintained position mode of operation, and opening up the servo loop during accelerative portions of new position seeking modes of operation.

The invention, includes as other aspects thereof in a data storage disk device the further step of:

providing a single, data masked servo sector on a data surface of the disk, prerecording track centerline servo control data in the servo sector, reading the servo data with a head passing adjacent to the disk surface containing the control sector, sampling and holding the read servo data, generating an offset correction signal, applying the offset signal to move the member so as to maintain and promote centerline alignment of a data transducer head carried on the member with each selected concentric data track during data read and/or write operations, to provide a fine position servo control loop, and overriding the loop during accelerative portions of the track seeking operations.

Other objects, advantages and features of the invention will be apparent to those skilled in the art from a consideration of the following detailed description of a preferred embodiment, presented in conjunction with the accompanying drawings.

BRIEF DESCRIPTION OF THE DRAWINGS

In the Drawings:

FIG. 9 is a somewhat diagrammatic view in side elevation and vertical section of a disk drive and head carriage assembly in accordance with the principles of the present invention.

FIG. 12 is a view in side elevation and section of a portion of the wirewound rotor depicted in FIG. 10 taken along the line 12—12.

FIG. 13 is a block diagram illustrating an alternate embodiment of the present invention wherein the rotor and optical encoder-based coarse servo loop shown in FIG. 1 is replaced with an electrical detent, microstep providing stepping motor.

DESCRIPTION OF A PREFERRED EMBODIMENT

Figure 1:
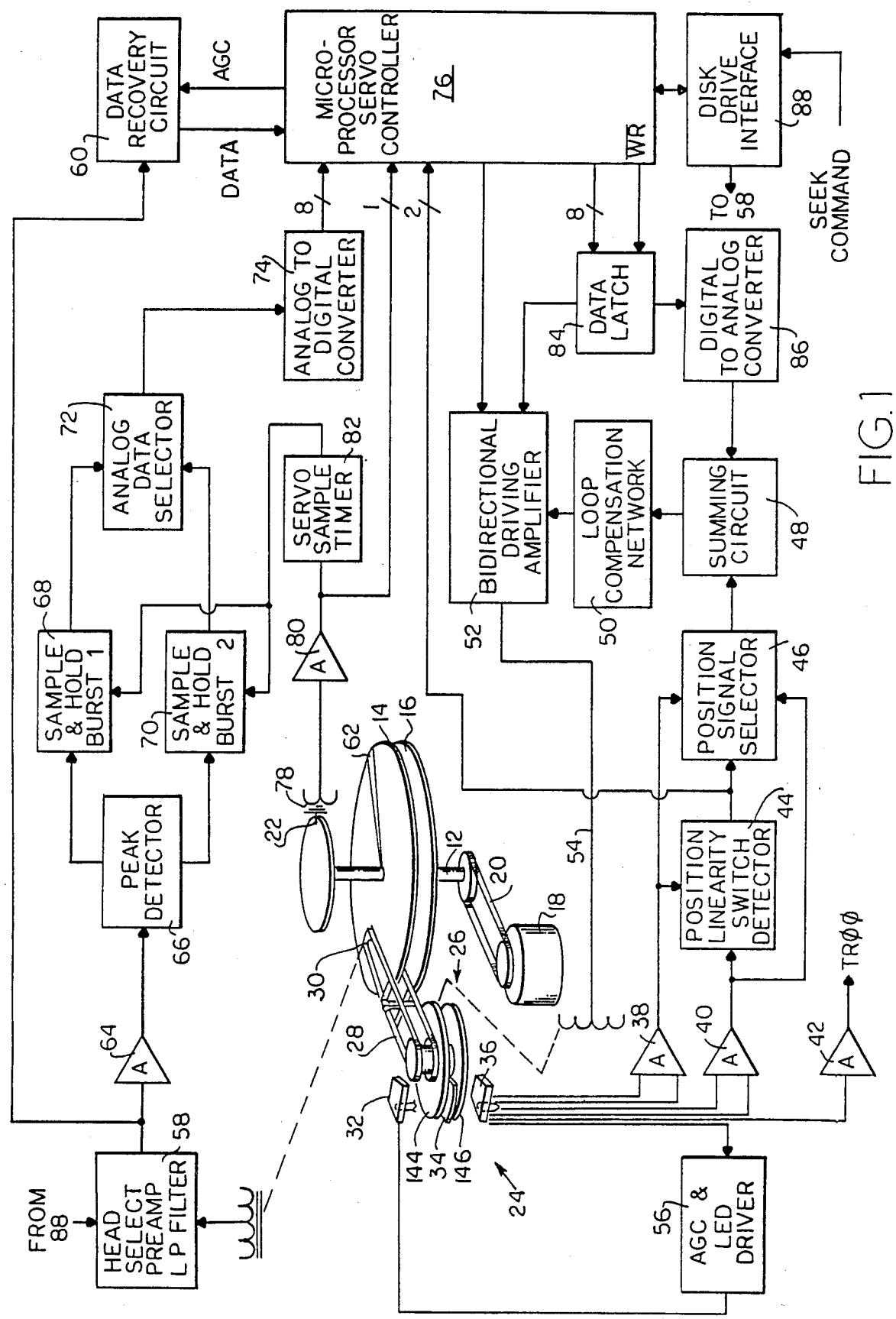
FIG. 1 is an overall system block diagram illustrating the principles of the present invention.
Figure 2:
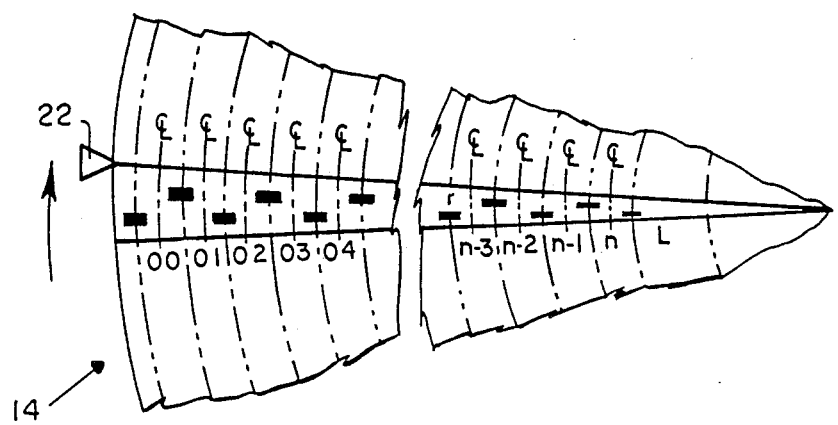
FIG. 2 is an enlarged and diagrammatic plan view of a wedge shaped portion of the rigid disk, illustrating the single servo sector pattern for inner and outer tracks, with the middle tracks broken away to save drawing space.

Referring to FIG. 1, the hard disk memory system 10 illustrated in overview therein is one in which a drive spindle 12 and one to four approximately eight inch diameter magnetic disks (two disks 14 and 16 are depicted) are caused to rotate about the common axis of the spindle at e.g. 50 Hz by a suitable disk drive motor 18 with pulleys and a drive belt 20 in conventional fashion. The system 10 may include as many as four or more magnetic disks, and disk diameters such as fourteen or five and one quarter inches are useable, although eight inches is presently preferred. The disks 14 and 16 may be formed from thin aluminium sheet having an oriented ferric oxide or other suitable magnetic coating on the major surfaces thereof. While magnetic surface disks are described insert the present invention may be effectively utilized with other kinds of data storage devices, including laser etched disks or optical storage devices. Each major surface of each disk 14, 16 carries a multiplicity of radially displaced concentric data tracks 00 through n, as depicted in FIG. 2. 512 data tracks are presently preferred for each data surface in the system 10. A landing zone L is located inside the intermost data track n. An index marker 22 provided on the spindle (FIG. 9) is used to provide a tachometer or index clock signal which is used to control servo operations in a manner to be described shortly and which also serves as a check to assure that the disks are rotating at the desired 50 Hz angular velocity.

A head carriage assembly 24 includes a pure-torque-generating rotor 26 to which head support beams 28 are mounted for radial movement relative to the disks 14, 16. The rotor 26 is described in greater detail hereafter in connection with FIGS. 9-12. Read and write transducers (heads) 30 are secured at the periphery of the support beams 28, and these heads may be of the type which ride upon an air bearing effect in accordance with what has come to be known in the art as Winchester technology.

Figure 6:
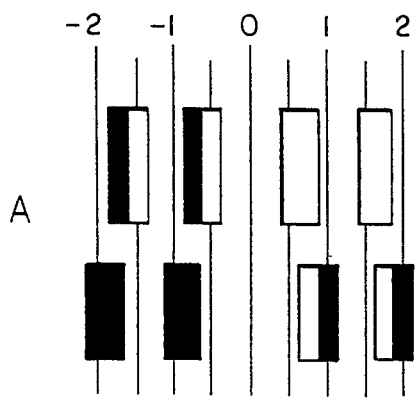
FIG. 6(A-D) is a series of graphic representations of the operational states of the sensor assembly depicted in FIG. 5.
Figure 6:
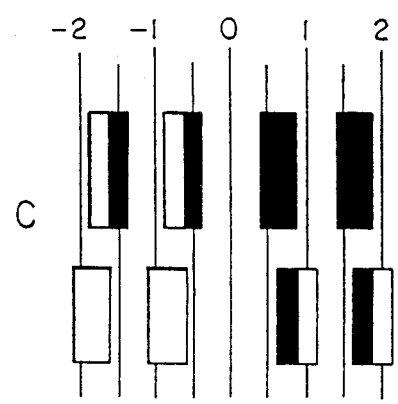
Figure 6:
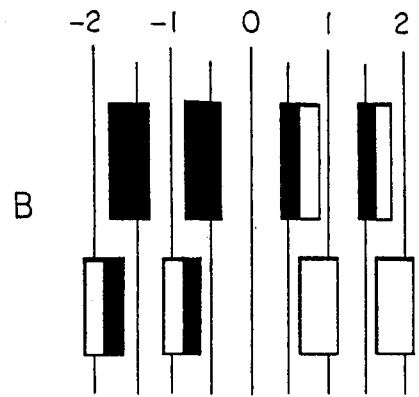
Figure 6:
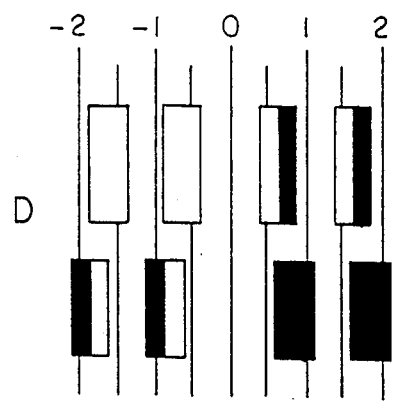
Figure 7:
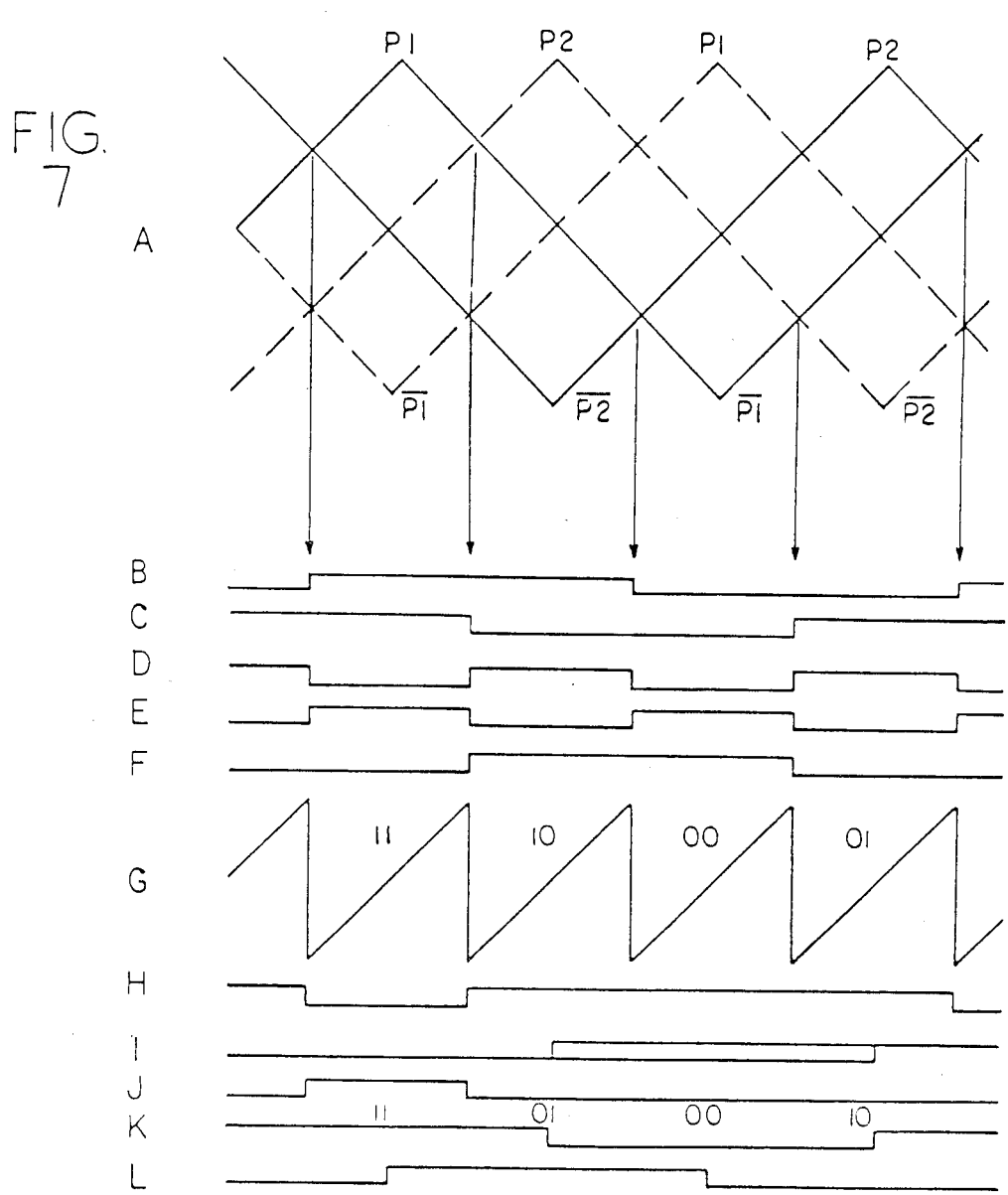
FIG. 7(A-L) is a waveform diagram of the control signals generated by the FIG. 1 system in response to the FIG. 4 sensor.

A coarse head position electro-optical transducer includes a controlled current light emitting diode source 32, a scale 34 having a series of equally closely spaced microscopic radial lines, and an integrated circuit photo sensitive reticle-masked array 36, which in combination produce the light and dark polyphase (e.g. quadrature) patterns depicted in FIG. 6 and are used to generate the sawtooth servo waveform depicted in FIG. 7.

There are five outputs from the photo sensitive array 36. Four of the outputs are quadrature track position signals which are processed by the differential amplifers 38 and 40. The fifth is a signal which indicates location of the head 30 at track zero zero (i.e. the radially outermost useable data track) and it is amplified and shaped by an amplifier 42. The quadrature signals from the differential amplifier 38 and 40 are supplied to a position linearity switch detector circuit 44 which provides the waveforms depicted in FIG. 7B and C, and also to a position signal selector circuit 46, the operation of which is controlled by the switch detector circuit 44.

Figure 5:
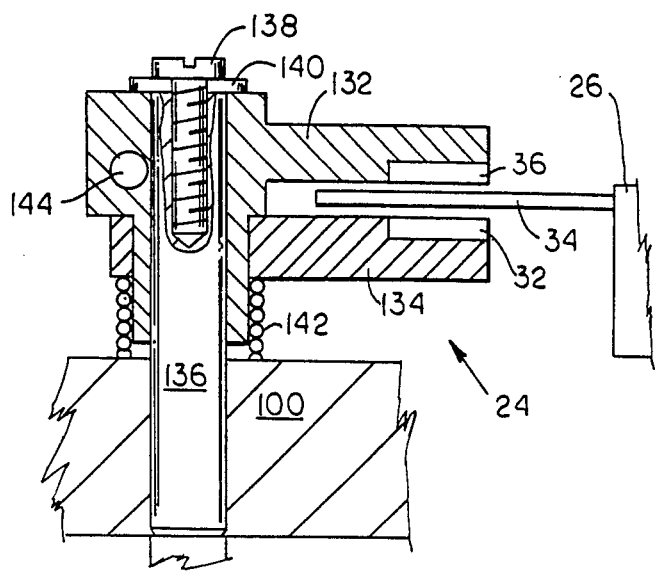
FIG. 5 is an enlarged sectional view in side elevation of the coarse head position sensor assembly of the system depicted in FIG. 1.

As depicted diagramatically in FIG. 1, structurally in FIG. 5, optically in FIG. 6 and electrically in FIG. 7, the scale 34 rotates with the head structure 28 relative to the frame. With this rotation the scale microlines pass between and interrupt the light beams passing from the source 32 to the detector array 36. With the geometry of the detector array 36 being in accordance with the FIG. 6 sketches, four data tracks may be defined by each microline and space.

The geometry of the light sensitive photodiode array 36 is depicted in FIG. 6. Actually there are four pairs of detector windows, which are radially offset by a distance of a half of a microline. Each window pair sees four phases of each line: first half line, full line (full dark), last half line, and no line (full light). The window pairs are further paired together diagonally. For example the top left window pair and the bottom right window pair provide the two differential inputs to the amplifier 38, and the bottom left and top right pairs are the inputs to the amplifier 40. In FIG. 6A equal and oppositely phased light and dark areas in the upper left and lower right detector pairs provide a null output defining one track. In FIG. 6B the scale has moved to the next phase so that full lines are now seen in the top left windows. In this situation the bottom left and top right are equal and opposite, and the amplifier 42 is at null point defining the next data track. In FIG. 6C the scale has moved yet another half line width and the third phase pattern presented is the same as FIG. 6A except for phase reversal. In FIG. 6D the scale has moved still another half line width to the fourth phase pattern, similar to the FIG. 6B pattern except for phase reversal.

The output of the position linearity switch detector 44 is depicted as the FIG. 7-B and C waveforms. The output from the position signal selector 46 is an analog value which is supplied to a summing network 48, and then on through a loop compensation (damping) network 50, a bidirectional moving coil motion driving amplifier 52 and ultimately to the armature of the rotor 26 via a bidirectional rotation driving line 54. The analog value produces a correction torque to keep the heads 30 within the boundaries of each data track defined by the scale 34 and photodetector 36. The light emitting diode light source 34 is powered by a driver circuit 56 which includes an automatic light level (AGC) control developed from a sixth photodetector in the detector array 36.

The data read by one of the transducers 30 is selected, preamplified and low pass filtered by the circuits denoted by the block 58 of FIG. 1. Thereafter, the reproducted MFM formatted data is recovered by a data recovery circuit 60 and sent to the computer or other appliance to which the system 10 is connected for random access data storage and retrieval.

A fine position closed loop servo system is employed by memory system 10 to assist in maintaining alignment between heads 30 and the centerlines of the data tracks on the surfaces of the disks 14 and 16 during memory system read and write operations. To this end, one disk surface 14 may be provided with a narrow, 200 byte wide data masked sector 62, which is depicted diagramatically in FIG. 2 and electrically by the FIG. 3 waveforms. Each data track, from track zero zero to track n (e.g. track 511) is provided with two factory prerecorded frequency bursts, a first occurring burst B1 on the outside half of e.g. odd tracks (and inside half of e.g. even tracks), and a second occurring burst B2 on the inside half of odd tracks (outside half of even tracks). Bursts B1 and B2 are prerecorded at a position on the disk surface which is determined by the occurrence of the index clock signal generated from spindle index marker 22. In particular, index marker 22 is detected by a detector 78 and, as seen in FIG. 1, instead of being sent directly to the disk drive interface 88 is sent to a digital system controller microprocessor 76 to mark the location in time of the servo sector on the disk. In the embodiment of FIG. 2, bursts B1 and B2 immediately follow in time the occurrence of the index clock signal generated from spindle index marker 22 when disk 14 is rotating at proper velocity in the direction of arrow 63. With the single servo sector so located in relation to the index clock signal, the data masked servo sector is established. The read/write data can then be stored and retrieved in each cylindrical data track following the single servo sector on the disk surface in a data format which is substantially unrestricted by the single servo sector. The sector bursts B1 and B2 are read once each disk revolution by the head 30 and are used to provide a fine head position servo loop control signal to the rotor 26 in the form of an offset voltage to urge the head 30 into alignment with the centerline of the track. Each burst is read in turn and integrated by the peak detector 66 to provide the amplitudes thereof. These amplitudes are then sampled and held by circuits 68 and 70. The held values are compared by an analog data selector 72, and a signed analog difference is converted to an eight bit digital value by an analog to digital converter 74. This digital value is processed in a digital system controller microprocessor 76, such as the Intel type 8048 which contains a 1k byte factory preprogrammed read only program memory and a 128 byte random access scratchpad memory.

A detector 78 detects the index mark on the drive spindle 12 with each revolution. This index clock signal is passed through an amplifier 80 and sent to the microprocessor 76 to provide a digital tachometer to determine whether the disks are rotating at correct speed and to mark the location in time of the servo sector on the disk. The index clock is also processed by a servo sample timer 82 which is used to enable and switch between the sample and hold circuits 68 and 70.

Figure 3:
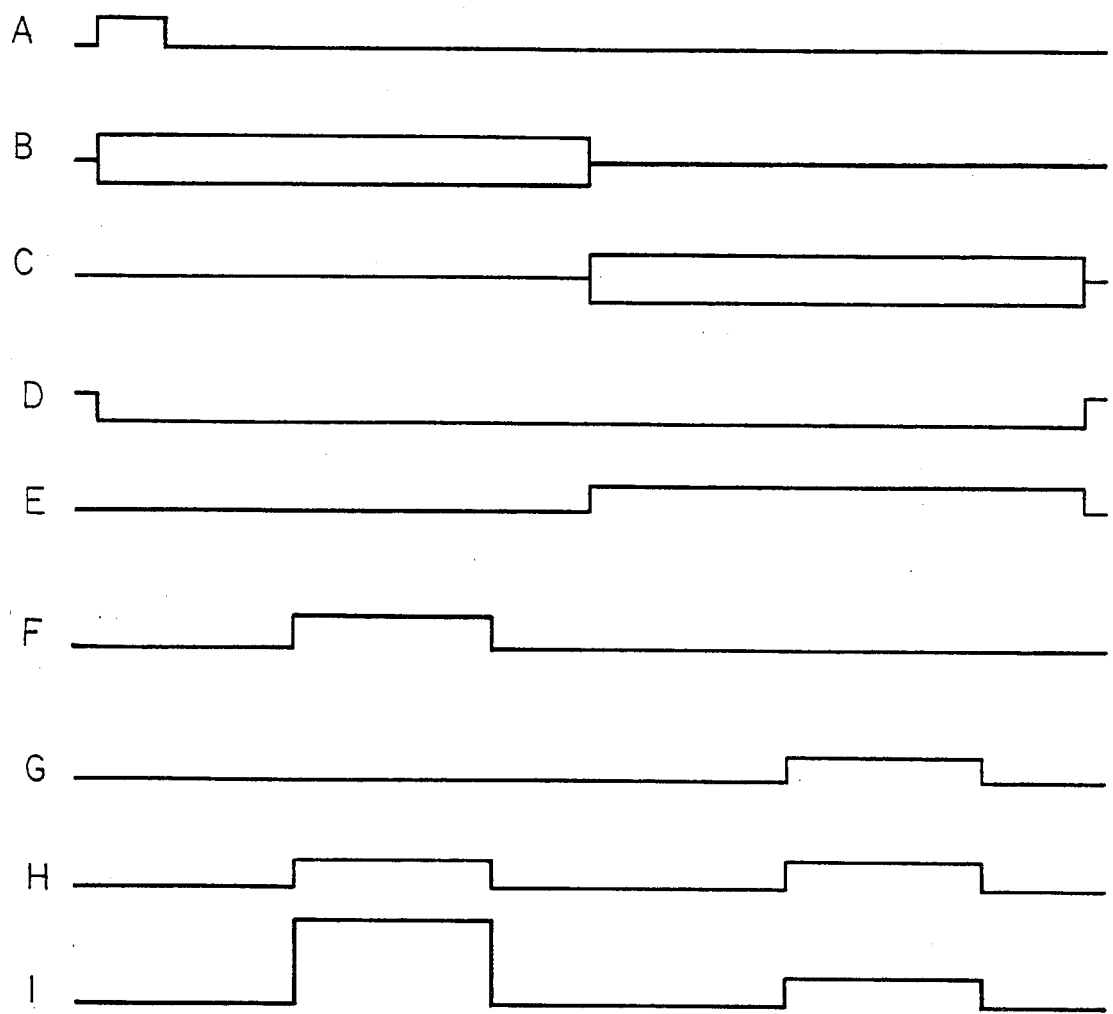
FIG. 3(A-I) is a series of timing and waveform diagrams related to the operation of the system in response to sensing the track servo sector information depicted in FIG. 2.

The waveforms of FIG. 3 illustrate the operation of the circuit elements 30, 58, 64, 66, 68, 70, 72, 74, 76, 78, 80, and 82 which provide the fine position servo. Waveform A depicts the 50 Hz index pulse I generated by the index detector 78. Waveforms B and C depict the first occuring Burst 1 and second occuring Burst 2. Waveform D depicts the servo sector data window which immediately follows each index pulse and which delineates in time the data masked servo sector. Waveform E shows the control signal from the servo sample timer 82 as it is applied to the sample and hold circuits 68 and 70: it divides the sector into two 100 byte halves. Waveform F shows the amplitude of a first burst A stored in the first sample and hold circuit 68. Waveform G shows the amplitude of the second burst B stored in the second sample and hold circuit 70. Waveform H depicts equivalence of sensed amplitudes which obtains when the head is properly aligned within one data track. In this situation no offset value is required and none will be supplied by the microprocessor 76 to the rotor 26. Waveform I depicts a much larger first burst than second burst which indicates the head is not on center but is close to an edge of the track. In this manner, microprocessor 76 is able to take into account position errors such as those caused by thermal expansion of the disks 14 and 16 as internal ambient temperatures rise.

It will be appreciated by inspection of FIG. 2 that servo bursts on innermost tracks n-3, n-2, n-1 and n are much smaller in amplitude than bursts on outermost tracks 00, 01, 02, 03, and 04. Consequently, in order to calculate a valid offset signal for fine position servo purposes, it is necessary to calculate the percentage of difference between burst amplitudes with the microprocessor 76. This calculation automatically provides an automatic gain control (AGC) signal for each track, a signal which may be applied to the data recovery circuit 60 or to other circuits for providing gain equalization for recovered data.

A disk drive interface circuit 88 receives control information from the host computer, etc. and supplies that information, including track seek data to the microprocessor 76. Data surface/head select information is sent directly to the head select circuit 58. The microprocessor 76 always knows where the head is presently located because of a two bit quadrature signal line from the switch detector 44. The microprocessor 76 determines how far and in what direction to move the head (seek) and then it calculates a set of numbers which are put out in a sequence dependent upon actual head position during the seek operation.

Figure 4:
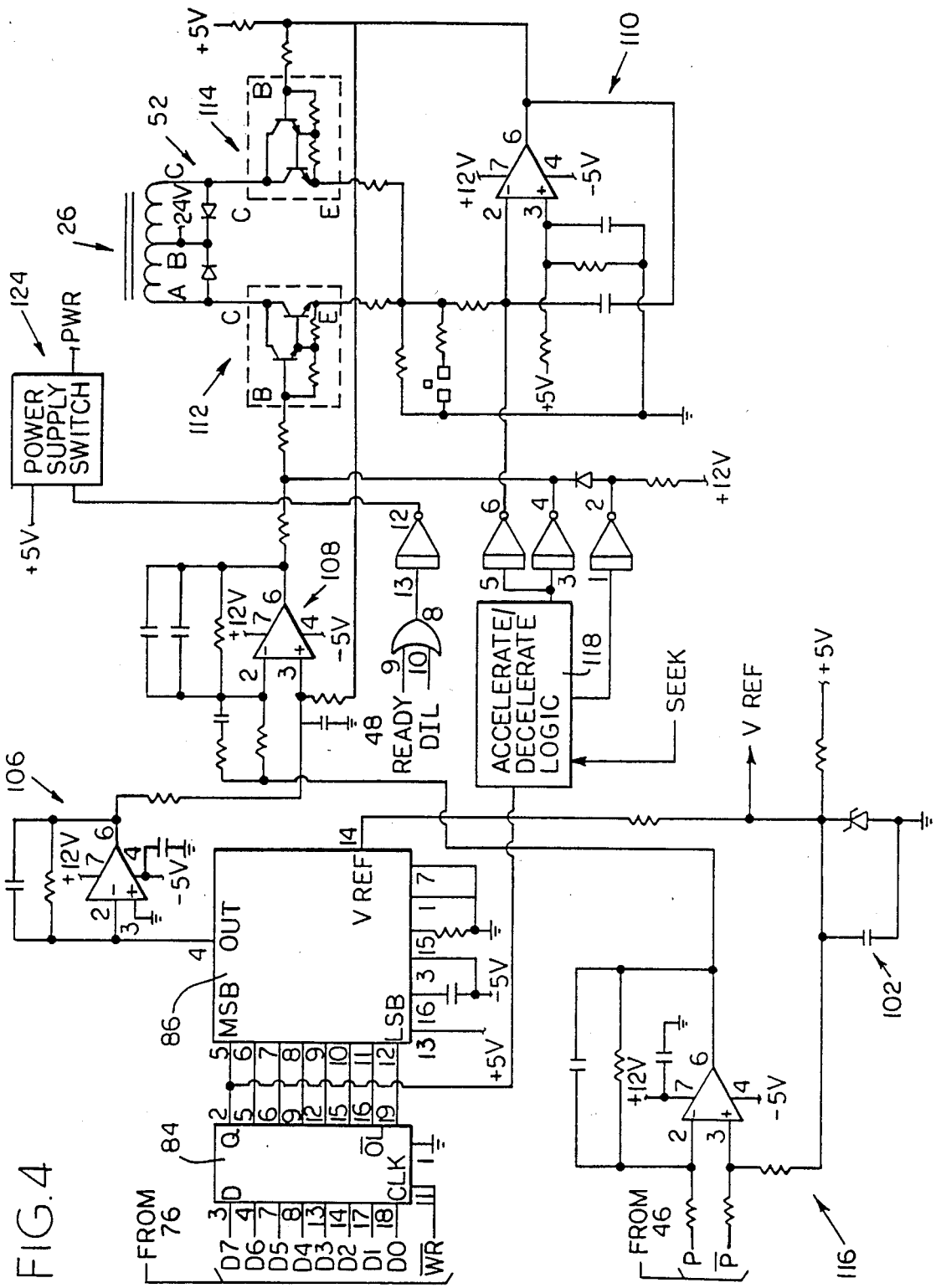
FIG. 4 is a block and schematic diagram of some of the circuitry of the system depicted in FIG. 1.

Some of the major elements of the coarse position closed loop servo and the digital override circuitry are depicted in FIG. 4. Therein, the latch 84 is depicted as a standard TTL type 74LS374 latch which is clocked by an input from the WRITE line of the microprocessor 76. The digital to analog converter (DAC) 86 is implemented as a Motorola type MC1408L8, and it receives the latched 8 bit digital numbers of offset values from the latch 84 and converts them to control currents. A voltage reference circuit 102 is utilized to reference the DAC to system voltages. An operational amplifier current to voltage converter 106 buffers and scales the resultant analog control voltage from the DAC 86. The summing circuit 48 in the implementation depicted in FIG. 4 occurs at the input of the driving amplifier 52 which is supplied with the analog offset voltages from the DAC 86 and the coarse servo loop voltages from the position signal selector 46.

The circuitry of the bidirectional driving amplifier 52 emulates the operation of a differential output amplifier. To do this, the circuitry includes two amplifiers 108 and 110 wired as shown in FIG. 4. The analog controls to the driving amplifier 52 occur at the input of the op amp 108, and the digital seek override controls are applied directly to the inputs of two Darlington pair power drivers 112 and 114 which drive the two windings A-B and B-C of the rotor. (See discussion of FIG. 11, below). The op amp 110 functions to make the characteristics of the driver 114 opposite and complementary to the input of the driver 112.

An operational amplifier 116 receives two complementary coarse servo loop control signals P and bar P from the position signal selector 46. These values are equal and opposite and of minimum amplitude when the head carriage 28 is in general alignment within any given defined track. The P and bar P values are derived by the position signal selector 46 from the digital quadrature waveforms K and L depicted in FIG. 7.

An accelerate and decelerate combinatorial logic array 118 accepts a two bit word derived from the high order data bit clocked from the latch 84, and a binary control line from the microprocessor 75 designated the SEEK enable line. The logic 118 provides digital outputs which are buffered and inverted and are then applied to the input of the power amplifier 112 via a line 120 and to the inverted input of then amplifier 114 via a line 122 (and the inverting op amp 110). The power amplifiers 112 and 114 may be implemented as type TIP 140 power Darlington pairs which are thermally sumped into a cast aluminum frame 100 (FIG. 9) of the system 10. The operational amplifiers 106, 108, 110, and 116 may be type 741, or equivalent.

A power supply switch 124 switches on the power supply to the amplifier 52 only when it concurrently receives three enabling signals: a signal indicating presence of the required supply voltages, a READY control signal from the microprocessor 76, which denotes that the disks 14, 16 are spinning at operating velocity, and an Drive Inhibit Line signal. In the event of a loss of operating velocity, power supply potential, or in case of a system reset, power is removed from the driver amplifier 52, and the head carriage assembly 28 automatically returns to the inner landing zone in response to a bias spring 194 (FIG. 9) which operates in default of the rotor 26.

The individual circuit components depicted in FIG. 4 are connected as shown and will not be discussed further, since the values and connections are readily derived by those skilled in the art.

Referring to FIG. 1, an eight bit data word output from the microprocessor 76 is supplied to a data latch 84 which is clocked by the WRITE enable line of the microprocessor 76. Each eight bit number held in the latch 84 is converted to an analog value by the digital to analog converter 86. The high order latched bit, along with another control line direct from the microprocessor 76, is applied directly to the driving amplifier 52 so as to override the coarse position servo system (elements 24, 38, 40, 44, 46, 48, 50) during the maximum accelerative and declerative phases of a track seek operation. In the final phase of track seek, a predetermined velocity slewing rate is achieved by recurrent number series which are converted to analog values by the converter 86 and applied to the summing circuit 48. During the initial maximum accelerative and decelerative step function portion, the coarse servo loop is completely overriden. At about eight tracks from destination track, the maximum deceleration command is removed just before the carriage assembly 24 ceases to move. Thereafter, the coarse servo is commanded to slew across each track by a progressive analog staircase signal which is reset to zero with each detected track crossing. In this way, the coarse servo, under the command of the microprocessor 76, operates solely upon the position information derived from the transducter 24 and irrespective of actual instantaneous velocity of the head carriage assembly 24.

Figure 8:
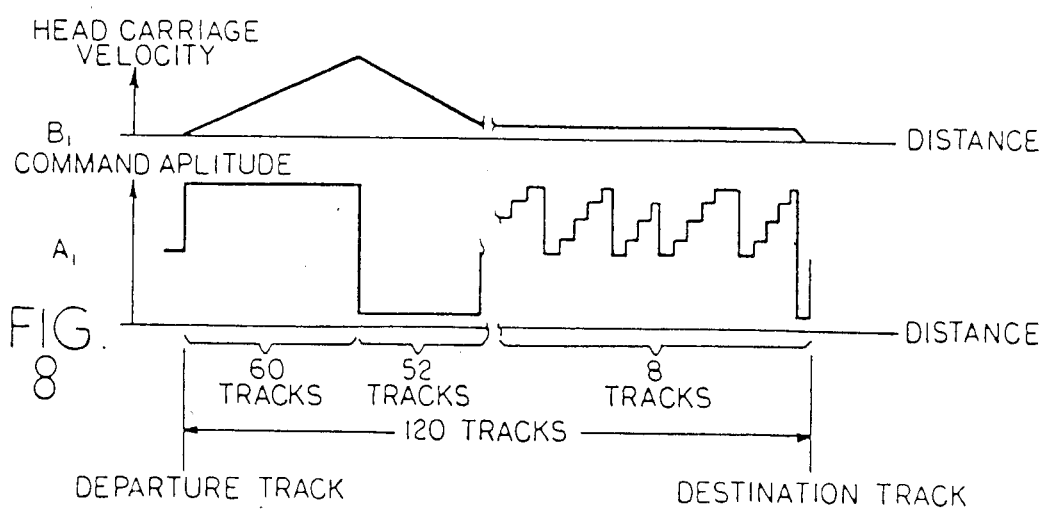
FIG. 8 is a waveform diagram depicting operation of the system of FIG. 1 during a track seeking operation of approximately 120 tracks in radial distance.

If a track crossing occurs sooner than expected, then the staircase command resets to zero before a maximum value is reached. If a track crossing is delayed, then the staircase reaches and holds its maximum value until the transition. These conditions are illustrated in FIG. 8A.

Finally, a short deceleration step function may be applied to stop the carriage assembly 24 at the destination track should its velocity not then have reached zero. Reading of the fine servo and updating of the analog offsets can then be performed by microprocessor 76. FIG. 8A depicts the digital and analog waveform utilized to command a track seek across e.g. 120 tracks. FIG. 8B portrays the velocity of the head carriage 24 relative to radial distance across the 120 tracks.

When the destination track has been reached, the system 10 enters a track extension control mode. One implementation of this mode is to select the appropriate monophase of the quadrature signal and servo over its full cycle (i.e. a distance of plus or minus two tracks). In this way the radial range of servo loop control covers a full four tracks, and only in the event that the head structure 28 is significantly jarred or otherwise is externally caused to move beyond plus or minus two tracks, will the coarse servo lose control. Upon a loss of servo control the system 10 enters a reset mode which resets the system and then returns the head 30 to the last selected track.

The microprocessor 76 has essentially five modes of operation or tasks: initialization, fine servo offset supervision, track seeking, emulation of other disk drive products, and self diagnostics. In the initialization or start up mode when power is first applied, the microprocessor 76 counts index pulses and compares them with an internal clock, to be sure that the disk spindle 12 is rotating at the proper velocity (50 Hz). The head 30 is initially located in a nonabrasive landing zone L (FIG. 2). The microprocessor 76 initially commands a seek to the outermost track (track 00). When the head 30 reaches this outermost track, a special output is obtained from the transducer 24 through the amplifier 42 (FIG. 7-J). The microprocessor 76 then calibrates the fine servo by measuring, establishing and remembering offsets for the four outermost tracks 00, 01, 02, 03, and then for the four innermost tracks n-3, n-2, n-1, n. If there is any difference in initial calibration between the outermost and innermost tracks, the microprocessor spreads this difference e.g. linearly over the total number of tracks of the system. The microprocessor 76 then commands the head 30 back to track 00. Initialization is then complete.

During read and write operations, the microprocessor 76 reads the fine servo continuously and updates the offset, to take into account position errors such as thermal expansion of the disks 14, 16 as internal ambient temperatures rise.

As already explained, the microprocessor 76 receives seek commands digitally from the host computer via the disk drive interface 88. The microprocessor 76 maintains head position data in a register which counts the tracks from information derived from the coarse position transducer 24. The difference between the track at which the head is presently located and the track sought, together with the sign value of the difference, which indicates the direction of head movement required to accomplish the seek, is used to calculate the series of commands from the microprocessor 76 to the rotor 26.

The emulation function of the microprocessor 76 enables the system 10 to emulate the characteristics of other disk drives. One such emulation would be of the SA 1000 eight inch disk drive manufactured by Shugart Associates, a XEROX Corporation subsidiary located in Sunnyvale, Calif. The SA 1000 product utilizes two adjacent read/write heads, and the microprocessor 76 enables the system 10 to appear to a user as if two heads are actually physically present in the system. This emulation is readily provided by redefining the track counting structure in the microprocessor 76 into two series of interleaved odd and even tracks, and then reading odd tracks as though it were with one of the heads, and reading even tracks as though it were with the other of the heads. Other competitive disk drive equipment may be emulated by special programming of the microprocessor 76.

The self diagnosis function of the microprocesser 76 has short term and long term aspects. During operation, the microprocessor 76 constantly monitors disk rotating speed and head position. In the event of a discrepancy in either parameter, the microprocessor takes the disk out of service and informs the host machinery of the detection of an error. Other errors and error messages are easily included, including those particularly adapted to a data format or end use. Diagnostic routines may be contained in the read only memory of the microprocessor 76 or they may be recorded on one or more of the tracks of the disk 14, and called by the microprocessor 76 as required.

Referring now to FIG. 5, the coarse head position servo transducer 24 is depicted in enlarged structural side elevation and vertical cross section. The transducer 24 is a U-shaped assembly comprising an upper member 132 which supports the photodetector and reticle array 36, and a lower member 134 which is keyed to hold the LED light source 32 in vertical alignment with the photodetector 36. The scale 34 is a glass member having equally spaced apart chrome microlines deposited thereon. It is precisely and securely attached to the head support structure 28 e.g. at the rotor 26. The transducer 24 is mounted on a post 136 embedded in the cast aluminum frame 100 which securely supports all of the disk drive machinery.

A feature of the present invention is that the transducer 24 is adjustable in two dimensions with but one point of attachment to the frame 100. A vertical height setting screw 138 and lock washer 140 enables the members 132 and 134 to be adjusted up and down, so that the photodetector can be adjusted to within five thousandths of inch of the scale 34 to achieve the required resolution. A spring 142 biases the members 132 and 134 away from the frame 100.

Sideways alignment of the transducer 24 with respect to the scale 34 is achieved by rotating the members 132 and 134 about the axis of the post 136. A locking screw mechanism 144 locks the members 132 and 134 the post 136 at the desired sideways alignment.

The structural configuration of the system 10 is depicted in FIG. 9. Therein the drive hub 12 supports four disks, a top servo sector containing disk 14 and three lower disks 16. The index detector 22 is provided in a lower outer flange of the spindle 12, and the sensor 78 is secured through the frame 100. The spindle 12 is mounted to a spindle shaft 152 by a screw 154 and a washer 156. Ball bearing assemblies 158, 160 are placed in a cylindrical portion of the frame 100 and are held in a spaced apart configuration by a spring 162. A magnetic fluid seal 164 is placed above the bearing 158 and seals the bearings by magnetic cohesion of the sealing fluid. A bottom screw 166 secures a pulley, not illustrated, to the shaft, for the drive belt 20 from the motor 18.

Figure 10:
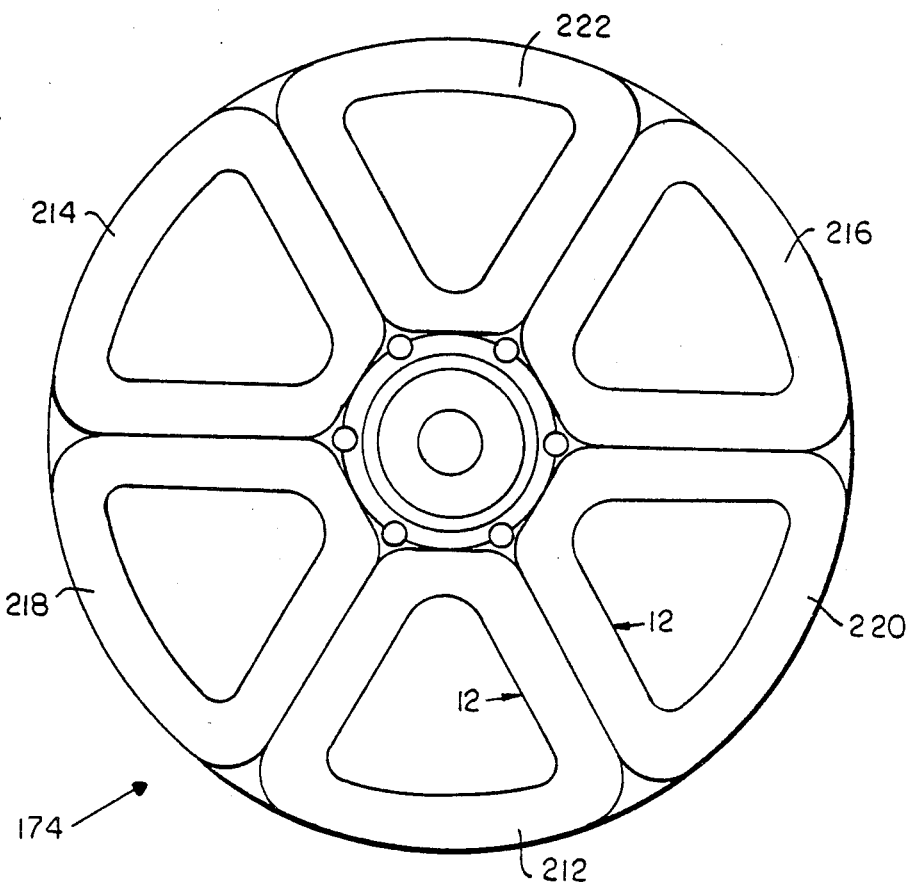
FIG. 10 is a top plan view of the hexagonal wirewound rotor of the head carriage assembly depicted in FIG. 9.
Figure 11:
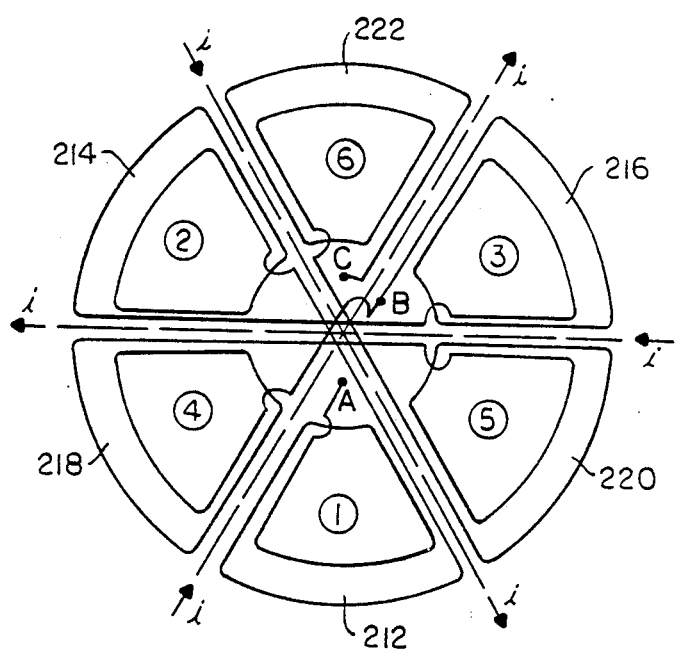
FIG. 11 is a schematic wiring diagram of the wirewound rotor of the head carriage assembly depicted in FIG. 9.

The rotor 26 is depicted in FIGS. 9, 10, 11 and 12. In the FIG. 9 vertical cross section, the rotor 26 includes a hub 172 to which the head structure assembly 28 is mounted. A flat coil assembly 174 is secured by a bonding means such as adhesive to the base of the hub 172. Immediately below the coil assembly 174 is a ferroceramic permanent magnet 176 which is fabricated as a unitary structure and then magnetized into a series of adjacent even-number opposed field magnetic segments in which the north and south poles alternate at the top and bottom of the magnet 176. The number of separate segments in the magnet 176 corresponds to the number of coil windings in the coil assembly 174. As shown in FIG. 10 and 11 there are e.g. six coil windings, as there are e.g. six separate magnetic segments in the magnet 176. An annular flux return plate 178 of low carbon steel forms a base for the magnet 176. In fabrication, a ceramic blank is glued to the base plate 178 and then the resultant structure is permanently magnetized. A fixed shaft 180 extends from a ribbed portion of the frame 100. The hub 172 is journaled to the shaft 180 by ball bearing assemblies 182 and 184 which are initially held in place during fabrication by an axial preload spring 186 and spacer 188, with adhesive locking the bearings 182, 184 to the hub 172.

A flux return top plate 192 is secured to the frame 100. A bias spring 194 extends from a standoff on the top plate 192 to the head carriage assembly 28 and biases it to return to the inner landing zone of the disks when power is removed from the rotor 26. Crash stops may be formed in the top plate 192 to limit range of head structure travel.

Other elements depicted in FIG. 9 include a printed circuit board 196 which carries the circuitry immediately associated with the optical transducer 24 including the elements 38, 40, 42 and 56 depicted in FIG. 1 and also the wiring connection for the heads 30. A main printed circuit board 198 carrying the rest of the circuitry of FIG. 1, is plugged into the board 196 at a plug 200. A plastic case 202 mates with the base 100 and provides an airtight seal throughout which is required for the reliable operation of flying head Winchester drive technology. An air filter 203 fits into a recess of the frame, and fins 204 extending from the flange at the base of the spindle 12 force air within the plastic enclosure 202 to pass through the filter. A breather filter 206 enables internal and external pressures to equalize.

To develop balanced torque or what we call "pure torque", which minimizes loading of bearings 182, 184, and enables very inexpensive bearings to be utilized, we have developed a coil assembly 174 comprising six separate coil windings 212, 214, 216, 218, 220, 222, each of which is generally triangular as shown in the FIG. 10 plan view and all of which may be wound from a single continuous wire strand, as shown schematically in FIG. 11. Three coils 212, 214, 216 are series connected together per the FIG. 11 schematic (A to B), while the other three coils 218, 220 222 are series connected together (B to C) in opposite phase to the first three coils. It will be appreciated that the rotor 26 must rotate in both directions. Use of two sets of opposed geometrically symmetrical coils enables this movement through a simple switching of the power supply from one winding set to the other. Each coil segment may be wound upon a generally triangular bobbin, the three connections A, B, C, established and then leads connected and extending to the outside. Each segment, in cross section (FIG. 12) is approximately nine turns across by 22 turns high, of 29 gauge copper wire. The coil assembly 174 is then placed in a forming mold, and an epoxy potting compound 224 is then placed and pressed into the mold to form the assembly 174 (FIG. 12). Adhesive is used to bind the coil assembly 174 to the hub 172. By utilizing potting compound 224 to form the assembly 174, a very high mechanical resonant frequency is achieved, and the assembly 174 dampens resonant vibration otherwise occuring in the head structure 28, thereby increasing the mechanical bandwidth of the coarse servo loop.

The coil assembly 174 is configured so that adjacent coil windings will produce equal and opposite forces resulting in a pure torque evenly applied about the axis of rotation of the rotor 26. If equal currents are present in both sides of the coil assembly 174 (A to B and C to B) these forces cancel, and there is no resultant torque produced. During seeking, in the event of any position error or disturbance occuring while the system 10 is operating in the closed loop track following or slewing modes, the current in the winding becomes imbalanced, and this condition yields a restoring torque which moves the head structure until a position yielding equalibrium in current is again reached.

Counterweights, not shown, are added to the rotor hub 172 to place the center of mass of the head structure 28 in alignment with the axis of rotation of the rotor 26. In this way, no unbalanced forces pass through the rotor bearings 182 and 184 as the rotor rotates about its axis.

It will be apparent to those skilled in the art that the present invention may be embodied physically in a wide variety of ways and with many different elements and components. For example, the optical transducer 24 may be implemented magnetically. Alternatively, transducer information may be provided in the servo sector 62 and read with each rotation of the disk 14. The rotor 26 may be replaced with an electrical detent, microstep providing stepping motor, and the combination of such a stepping motor with the time sampled fine servo loop will vastly improve track centerline following performance in a disk drive. FIG. 13 illustrates this latter alternative wherein a microstep providing stepping motor 260 receives control signals from a conventional bidirectional microstep driving amplifier 252 via driving line 254. Bidirectional driving amplifier 252 in turn receives track step commands directly from controller 76 in response to the input of a seek command through disk drive interface 88. As was the case with the coarse servo loop implentation of the present invention disclosed in FIG. 1, track centerline correction data obtained from the time sampled fine servo loop 30, 58 and 64-82 is supplied to bidirectional driving amplifier 252 through data latch 84 and digital to analog converter 86. The servo loop systems of the present invention are advantageously, but not necessarily, embodied in rotating magnetic disk storage devices. Other servo applications, such as in spectrophotometers and other machines characterized by highly interactive mechanical elements are within the scope of the present invention.

Having thus described an embodiment of the invention, it will now be appreciated that the objects of the invention have been fully achieved, and it will be understood by those skilled in the art that many changes in construction and circuitry and widely differing embodiments and applications of the invention will suggest themselves without departure from the spirit and scope of the invention. The disclosures and the description herein are purely illustrative and are not intended to be in any sense limiting.

We claim:

1. A servo system for use in a disk drive apparatus connectable to a host system which provides a first set of signals and monitors a second set of signals associated with the operation of a different disk drive, the disk drive apparatus including at least one data storage disk with a major surface having a multiplicity of data tracks, motor means for rotating the data storage disk at a predetermined proper angular velocity, index marker means for generating an index signal once per revolution of the data storage disk and a transducer for reading data from and writing data to the multiplicity of data tracks, said servo system comprising:

mover means for moving the transducer to a selected one of the multiplicity of data tracks and for holding the transducer within the boundaries of the selected data track;

a single servo sector disposed on the major surface of the data storage disk at a location which is determined in time by the index signals, aid single servo sector having prerecorded therein track centerline information for the selected data track readable by the transducer;

servo control means for marking said location of said single servo sector and for performing a servo operation in response thereto, said servo control means including a controller circuit means connected to the transducer, said mover means and the index marker means for receiving said track centerline information read from said single servo sector by the transducer once during each revolution of the data storage disk and for enabling the mover means to move the transducer into alignment with the centerline of the selected data track as a function of said track centerline information read by the transducer; and emulation means capable of performing a disk drive emulation function, said emulation means including said controller circuit means configured for processing the first set of signals associated with the different disk drive and for generating the second set of signals associated with the different disk drive in order to enable the disk drive apparatus to emulate the different disk drive, said emulation means also including an interface means connected to said controller circuit means for receiving the first set of signals from and for sending the second set of signals to the host system.

2. A servo system as set forth in claim 1, wherein said controller circuit means includes a programmable circuit means which can be programmed to process at least one of the first set of signals and which can also be programmed to generate at least one of the second set of signals.

3. A servo system as set forth in claim 2, wherein said programmable circuit means includes a programmable microprocessor.

4. A servo system as set forth in claim 3, wherein said programmable microprocessor is connected to receive the index signal and responsively marks the location in time of said single servo sector on the data storage disk.

5. A servo system as set forth in claim 1, wherein the first set of signals includes data for calculating the number of tracks which said mover means must move the transducer in order to reach said selected data track and said controller circuit means includes a programmable circuit means programmed to process the data for calculating the number of tracks which said mover means must move.

6. A servo system as set forth in claim 5, wherein the data for calculating the number of tracks which said mover means must move includes digital signals in the form of seek commands received from the host system through said interface means and said programmable circuit means is programmed to process the digital signals.

7. A servo system as set forth in claim 6, wherein said programmable circuit means is programmed to emulate the operation of a disk drive having two adjacent read/write heads by defining a track counting operation which divides the multiplicity of data tracks into two series of interleaved odd and even tracks and then electrically assigns odd numbered tracks to correspond with tracks read by one of the two adjacent read/write heads in the disk drive being emulated while electrically assigning even numbered tracks to correspond with tracks read by the other of the two adjacent read/write heads in the disk drive being emulated.

8. A servo system as set forth in claim 1, wherein the disk drive apparatus includes a plurality of data storage disks and a plurality of transducers respectively associated therewith and the first set of signals includes head select signals which indicate that a desired one of the plurality of transducers is to be used for data reading and data writing operations, said controller circuit means further including selector means for selecting the desired one of the plurality of transducers in response to receipt of the head selecte signals by the interface means.

9. A servo system as set forth in claim 1, wherein the second set of signals includes a READY control signal which denotes that the data storage disk is rotating at the proper angular velocity, said controller circuit means operating to receive the index signal from the index marker means as a measure of the angular velocity of the data storage disk, said controller means including a programmable circuit means programmed to generate the READY control signal when the data storage disk is rotating at the proper angular velocity as determined in response to receipt of the index signal by said controller circuit means.

10. A servo system as set forth in claim 1, wherein the second set of signals includes error messages which are adaptable to particular data formats and said controller circuit means includes a programmable circuit means programmed to generate the error messages.

11. A servo system as set forth in claim 1, wherein the second set of signals includes a track 00 signal which indicates when the transducer is over the outermost one of the multiplicity of data tracks, said servo control means including a detector means for detecting when the transducer is over the outermost one of the multiplicity of data tracks and said controller circuit means including an amplifier means connected to said detector means for generating the track 00 signal.

12. A servo system as set forth in claim 1, wherein the disk drive apparatus further includes data recovery circuit means for reproducing data read by the transducer in MFM format and said controller circuit means is adapted to pass the MFM formatted data to said interface means.

13. A servo system as set forth in claim 1, wherein said controller circuit means includes sample-and-hold circuitry connected to the transducer.

14. A servo system as set forth in claim 13, wherein said controller circuit means includes a programmable microprocessor connected to said sample-and-hold circuitry, said programmable microprocessor being programmed to provide an offset signal indicative of the amount of displacement which the transducer must undergo into order to achieve alignment with the centerline of the selected data track.

15. A servo system as set forth in claim 1, wherein the selected data track to which said mover means moves the transducer may comprise any one of the multiplicity of data tracks and said single servo sector has prerecorded therein track centerline information for all of the multiplicity of data tracks.

16. A servo system as set forth in claim 1, wherein said location of said single servo sector immediately follows in time the occurrence of the index signal.

17. A servo system as set forth in claim 1, wherein data may be written to or read from said selected data track following said single servo sector in a substantially unrestricted data format.

* * * * *

UNITED STATES PATENT AND TRADEMARK OFFICE
CERTIFICATE OF CORRECTION

PATENT NO. : 4,660,106

DATED : April 21, 1987

INVENTOR(S) : Joel N. Harrison, Donald V. Daniels, David A. Brown

It is certified that error appears in the above-identified patent and that said Letters Patent are hereby corrected as shown below:

Claim 1
Column 14, Line 5 should read:

-- mined in time by the index signal, said single servo --.

Signed and Sealed this

Fourteenth Day of February, 1989

Attest:

DONALD J. QUIGG

*Attesting Officer*        *Commissioner of Patents and Trademarks*